(12) United States Patent  
Fuehrer

(10) Patent No.: US 8,958,978 B2  
(45) Date of Patent: Feb. 17, 2015

(54) METHOD AND DEVICE FOR MONITORING A VEHICLE OCCUPANT

(71) Applicant: Thomas Fuehrer, Stuttgart-Weilimdorf (DE)

(72) Inventor: Thomas Fuehrer, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/954,466

(22) Filed: Jul. 30, 2013

(65) Prior Publication Data

US 2014/0039788 A1 Feb. 6, 2014

(30) Foreign Application Priority Data

Jul. 31, 2012 (DE) .......................... 10 2012 213 466

(51) Int. Cl.
| | | |
|---|---|---|
| G06F 17/10 | (2006.01) | |
| G08G 1/16 | (2006.01) | |
| B60K 28/02 | (2006.01) | |
| G06Q 30/02 | (2012.01) | |
| G06Q 50/30 | (2012.01) | |

(52) U.S. Cl.
CPC ........ *G08G 1/16* (2013.01); *B60K 28/02* (2013.01); *G06Q 30/0242* (2013.01); *G06Q 30/0241* (2013.01); *G06Q 50/30* (2013.01)
USPC .......................................... 701/301

(58) Field of Classification Search
USPC .......................................... 701/301
See application file for complete search history.

(56) References Cited

U.S. PATENT DOCUMENTS

| | | | | |
|---|---|---|---|---|
| 8,301,343 | B2 * | 10/2012 | Tanimoto ........................ 701/43 |
| 8,724,858 | B2 * | 5/2014 | Kawakubo ..................... 382/118 |
| 2001/0018641 | A1 * | 8/2001 | Kodaka et al. ................. 701/301 |
| 2008/0060497 | A1 * | 3/2008 | Lambert et al. .................. 84/307 |
| 2008/0201039 | A1 * | 8/2008 | Matsuoka et al. .............. 701/41 |
| 2009/0051516 | A1 * | 2/2009 | Abel et al. ..................... 340/436 |
| 2009/0115846 | A1 * | 5/2009 | Ohue et al. ..................... 348/148 |
| 2010/0049375 | A1 * | 2/2010 | Tanimoto .......................... 701/1 |
| 2010/0220892 | A1 * | 9/2010 | Kawakubo ..................... 382/103 |
| 2011/0025489 | A1 * | 2/2011 | Shimoda et al. .............. 340/459 |
| 2013/0184979 | A1 * | 7/2013 | Karandikar ................... 701/301 |
| 2013/0342334 | A1 * | 12/2013 | McQueen et al. ............. 340/436 |

FOREIGN PATENT DOCUMENTS

DE  10 2011 050 942  3/2012

* cited by examiner

*Primary Examiner* — Hussein A. Elchanti

(74) *Attorney, Agent, or Firm* — Kenyon & Kenyon LLP

(57) ABSTRACT

A method, a corresponding device, and a corresponding computer program for monitoring a vehicle occupant, including the following: detecting multiple objects in the vehicle surroundings with the aid of a surroundings detection device, detecting a viewing direction of the vehicle occupant with the aid of a gaze detection device, and automatically associating the detected viewing direction with one of the detected objects with the aid of an association device for a determination regarding which object of the multiple objects the vehicle occupant has viewed.

18 Claims, 2 Drawing Sheets

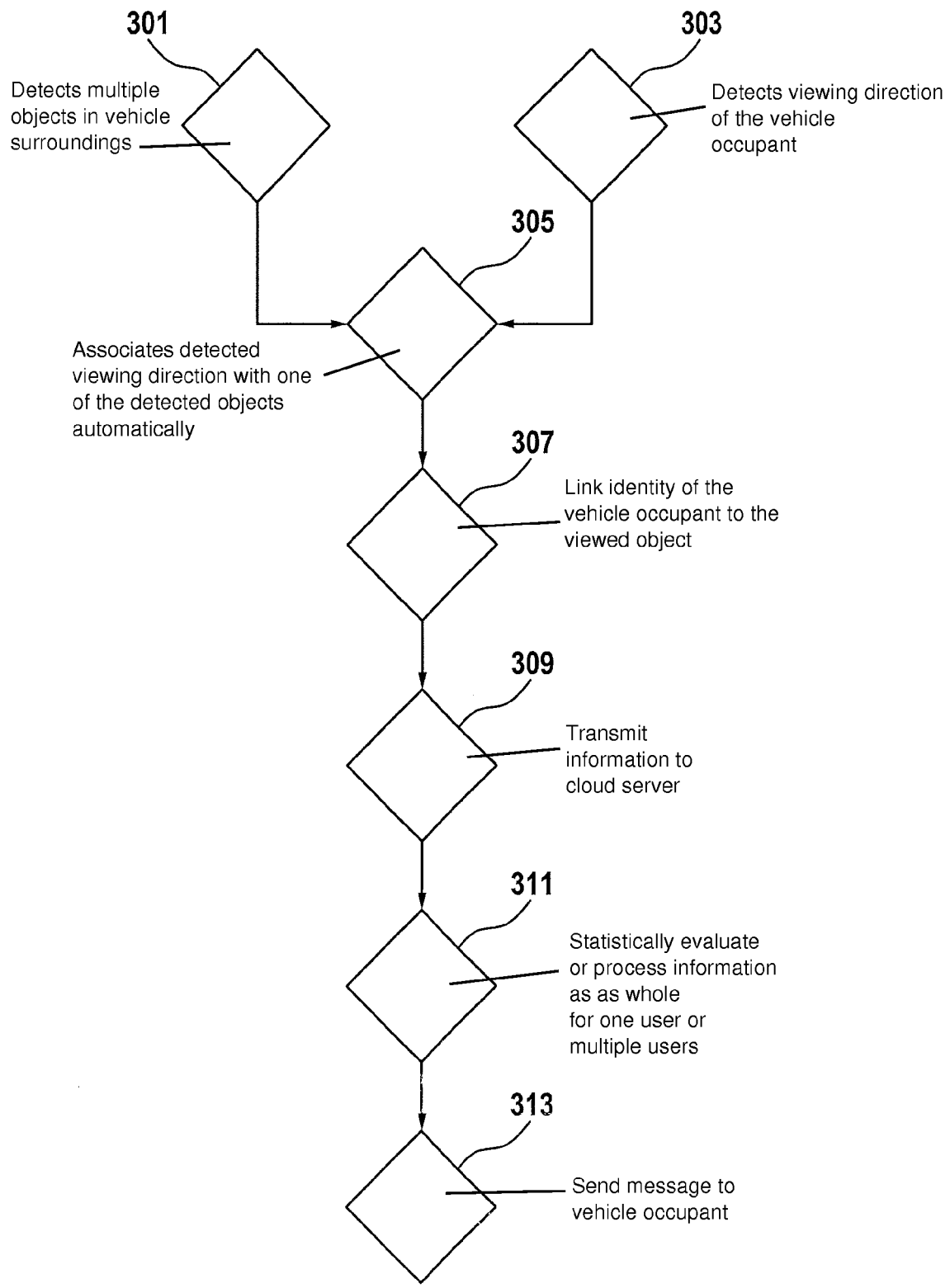

METHOD AND DEVICE FOR MONITORING A VEHICLE OCCUPANT

RELATED APPLICATION INFORMATION

The present application claims priority to and the benefit of German patent application no. 10 2012 213 466.2, which was filed in Germany on Jul. 31, 2012, the disclosure of which is incorporated herein by reference.

FIELD OF THE INVENTION

The present invention relates to a method and a device for monitoring a vehicle occupant. Moreover, the present invention relates to a computer program.

BACKGROUND INFORMATION

So-called eye tracking systems which are able to recognize a viewing direction of a person are known per se. Such a system is discussed, for example, in Published Unexamined German Patent Application DE 10 2011 050 942 A1 for reconfiguring a display in a vehicle.

SUMMARY OF THE INVENTION

An object upon which the present invention is based may be regarded as providing an improved method for monitoring a vehicle occupant.

Moreover, the object upon which the present invention is based may be regarded as providing a corresponding device for monitoring a vehicle occupant.

Moreover, the object upon which the present invention is based may be regarded as providing a corresponding computer program.

These objects are achieved by the respective subject matter of the description herein. Advantageous embodiments are the subject matter of the further descriptions herein.

According to one aspect, a method for monitoring a vehicle occupant is provided. Multiple objects in the vehicle surroundings are detected with the aid of a surroundings detection device. In addition, a viewing direction of the vehicle occupant is detected with the aid of a gaze detection device. The detected viewing direction is then automatically associated with one of the detected objects with the aid of an association device for a determination regarding which object of the multiple objects the vehicle occupant has viewed.

According to another aspect, a device for monitoring a vehicle occupant is provided. The device includes a surroundings detection device for detecting multiple objects in the vehicle surroundings. The device also includes a gaze detection device for detecting a viewing direction of the vehicle occupant. Furthermore, the device has an association device for automatically associating the detected viewing direction with one of the detected objects for a determination regarding which object of the multiple objects the vehicle occupant has viewed.

According to a further aspect, a computer program is provided which includes program code for carrying out the method for monitoring a vehicle occupant when the computer program is executed in a computer.

Due to the automatic association of the detected viewing direction with one of the detected objects, it is advantageously made possible to obtain information concerning which object in the vehicle surroundings the vehicle occupant has viewed. For example, an evaluation after an accident is thus simplified, in that the circumstances or cause of the accident may be better understood. In particular, it may thus advantageously be recognized whether or not the vehicle occupant was or is distracted during travel.

In particular, it may thus be advantageously checked during travel as to whether the vehicle occupant has seen objects that are relevant for safely driving the vehicle. Such relevant objects may be, for example, other vehicles, obstructions, navigation signs, or general information signs or boundary markers along the roadway.

Safety during travel may thus be advantageously increased, in that an accident risk may advantageously be reduced.

According to one specific embodiment, the vehicle occupant may be a driver of the vehicle.

In another specific embodiment, the vehicle occupant may be a passenger of the vehicle.

In another specific embodiment, multiple vehicle occupants may be monitored. That is, multiple passengers, for example, may be monitored. In particular, it may be provided that the driver and one or multiple vehicle occupants are monitored.

Objects in the vehicle surroundings refer in particular to objects situated outside the vehicle.

According to another specific embodiment, the detection of multiple objects in the vehicle surroundings includes a determination that objects are present in the vehicle surroundings. In addition, the detection includes in particular a classification of the individual determined objects. Thus, for example, information may advantageously be provided concerning exactly what type of object is involved. An object may be classified, for example, as a sign, an information sign, a vehicle speed limit sign, an obstruction, another vehicle, a marker, for example a traffic lane marker or a roadway boundary marker, a billboard, in particular an advertising poster at a bus station, an advertising pillar, a light signal system, colloquially also referred to as a traffic light, an electronic sign, an electronic display, or a junction.

According to one specific embodiment, it may be provided that the detected viewing direction is associated with one of the detected objects only when the detected viewing direction points, at least indirectly, in the direction of a vehicle window. Misassociations may thus advantageously be avoided, since a vehicle occupant is generally able to see the object only when his viewing direction points, at least indirectly, in the direction of a vehicle window. "At least indirectly" includes in particular the direct case. The term "indirectly" means in particular that the vehicle occupant gazes at a mirror or a mirrored or reflective surface, so that a view through the vehicle window is indirectly made possible via this surface. The term "directly" means in particular that the vehicle occupant gazes directly through the vehicle window. A mirror may be a rear view mirror, in particular an interior rear view mirror.

According to another specific embodiment, it may be provided that information concerning the viewed object is queried from a database and provided to the vehicle occupant. The vehicle occupant thus advantageously automatically obtains knowledge of relevant information concerning the viewed object without any action on his part. The provision may in particular be a visual and/or acoustic and/or haptic provision. If the object is a billboard, for example, the information may concern where the product advertised with the aid of the billboard may be purchased or may be looked at.

According to another specific embodiment, it may be provided that a navigation system provides the vehicle occupant with a recommended route based on the viewed object. This means in particular that the navigation system computes a route based on the viewed object and recommends this route to the vehicle occupant. If the viewed object is a billboard, for example, the recommended route may be a route to a location where the vehicle occupant may purchase the product advertised with the aid of the billboard. This means, for example, that such a location may be a location of a shopping center.

According to another specific embodiment, it may be provided that while the vehicle occupant is traveling on a route from a first position to a second position, a recording is made of which objects the vehicle occupant has viewed along the route in order to create a corresponding view/object profile for this route. In particular, it may be provided that the steps of detecting the multiple objects, detecting the viewing direction, and the automatic association are carried out continuously during the travel along the route. Information may thus be advantageously obtained concerning which objects the vehicle occupant has viewed along the route.

If the vehicle occupant travels the route multiple times, multiple such profiles may advantageously be formed which may then advantageously be statistically evaluated. This statistical evaluation may in particular be carried out in such a way that it is determined which of the objects along the route the vehicle occupant has viewed particularly often or particularly seldom. For example, the attractiveness of an advertising location may thus advantageously be researched and recorded.

In particular, it may also thus be recognized which of the information signs or the roadway boundary markers or the signs or the objects in general along the route are viewed particularly often or particularly seldom by the vehicle occupant. Safety-relevant objects which, for example, are less frequently viewed may be provided, for example, with a signal color or a signaling device, so that these may be better seen by the vehicle occupant. Thus, for example, safety may advantageously be increased for vehicles that travel along this route.

According to another specific embodiment, it may be provided that the recorded view/object profile is transmitted to a cloud server for an evaluation of the view/object profile. A cloud server refers in particular to a server that is external to the vehicle. Communication between the vehicle and the cloud server may be carried out, for example, with the aid of a wireless communication method, for example a mobile wireless communication method. The cloud server may provide a social network, for example.

Providing a cloud server advantageously allows the appropriately recorded view/object profiles of the vehicle occupants to be stored and evaluated, in particular statistically evaluated, by multiple vehicles. The information thus obtained may thus be statistically processed as a whole for one user or also for multiple users, in particular for the vehicle occupants. In addition, the attractiveness of an advertising location may also be researched and recorded in this way.

In particular, it may thus be determined which of the information signs or the roadway boundary markers or the signs or objects in general along the route are viewed particularly often or particularly seldom by the vehicle occupants. Safety-relevant objects which, for example, are less frequently viewed may be provided, for example, with a signal color or a signaling device so that they may be better seen by the vehicle occupant. Thus, for example, safety may advantageously be increased for vehicles that travel along this route.

For example, it may be provided that the cloud server queries the information from its internal database and/or from an external database and provides same to the vehicle occupant. It may be provided that the cloud server transmits the recommended route to the navigation system, which then provides the received recommended route to the vehicle occupant.

According to another specific embodiment, it may be provided that an identity of the vehicle occupant is detected and linked to the viewed object. Thus, information may advantageously be provided concerning exactly which person has viewed the object. Appropriate route recommendations or information may thus be provided on a personalized basis. In particular, it may be provided that in this case a comparison is made of personal data of a social network.

According to another specific embodiment, it may be provided that the provision of the information includes transmitting the information as a personal message to the vehicle occupant. The vehicle occupant is thus advantageously personally informed of the viewed object. For example, it may be provided that an e-mail and/or an SMS text message is/are sent to the vehicle occupant.

According to another specific embodiment, it may be provided that an instantaneous location of the vehicle occupant relative to a coordinate system formed externally with respect to the vehicle is determined and linked to the viewed object. This means in particular that the view/object profile includes appropriate location information. Precise localization is thus advantageously made possible concerning the exact location of the vehicle occupant when they view the object. In addition, localization of the viewed object is advantageously made possible. It may be provided that the locations may thus be represented on a digital map. In particular when multiple profiles are recorded, the exact locations on the digital map of individual objects that have been viewed, as well as how often, by the vehicle occupant and/or the other vehicle occupants of the other vehicles may thus be easily and clearly represented on the digital map.

According to one specific embodiment, it may be provided that the surroundings detection device includes a sensor system for detecting the vehicle surroundings by sensor. Such a sensor system may include one or multiple sensors, for example. The sensors may be configured as video, radar, ultrasonic, or LIDAR sensors, for example. It may be provided that the sensors have the same or a different configuration. This means, for example, that the sensor system may be a radar system. For example, a stereo video camera system may also be provided. Such systems are set up in particular for recognizing and appropriately classifying objects present along a route, in particular on a roadway or at the roadside, for example an advertising poster at a bus station or an advertising pillar or information signs. In particular, such systems are configured to carry out an assessment and a corresponding object classification. In particular, such systems are set up to carry out a distance measurement of the vehicle relative to the objects.

The gaze detection device is configured in particular to recognize or determine a viewing direction of the vehicle occupant. For example, it may be provided that for this purpose the gaze detection device detects and appropriately evaluates an eye movement and/or a head movement of the vehicle occupant. Accordingly, a gaze detection device may also be referred to as an eye tracking system.

According to another specific embodiment, a vehicle may be provided which includes the device for monitoring a vehicle occupant.

The present invention is explained in greater detail below with reference to the exemplary embodiments.

BRIEF DESCRIPTION OF THE DRAWINGS

FIG. 3 shows a flow chart of another method for monitoring a vehicle occupant.

DETAILED DESCRIPTION

Figure 1:
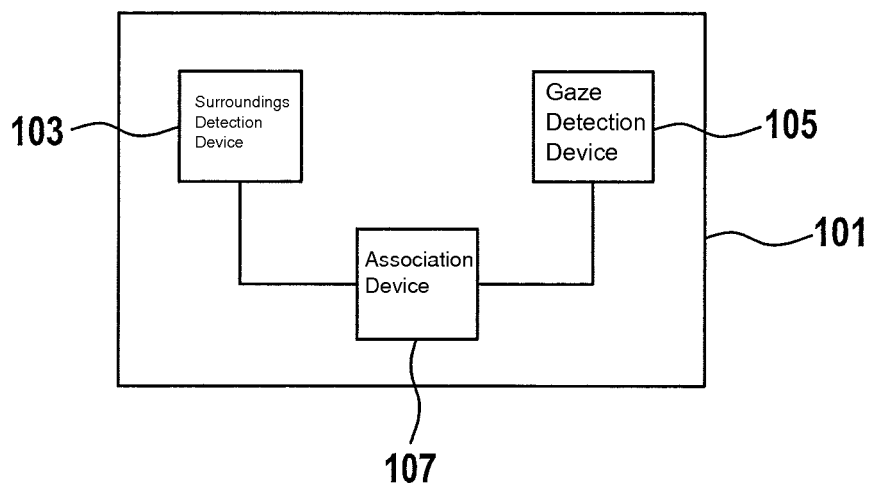
FIG. 1 shows a device for monitoring a vehicle occupant.

FIG. 1 shows a device 101 for monitoring a vehicle occupant (not shown).

Device 101 includes a surroundings detection device 103 for detecting multiple objects in the vehicle surroundings. In addition, device 101 includes a gaze detection device 105 for detecting a viewing direction of the vehicle occupant. Moreover, device 101 includes an association device 107 for automatically associating the detected viewing direction with one of the detected objects for a determination concerning which object of the multiple objects the vehicle occupant has viewed.

Figure 2:
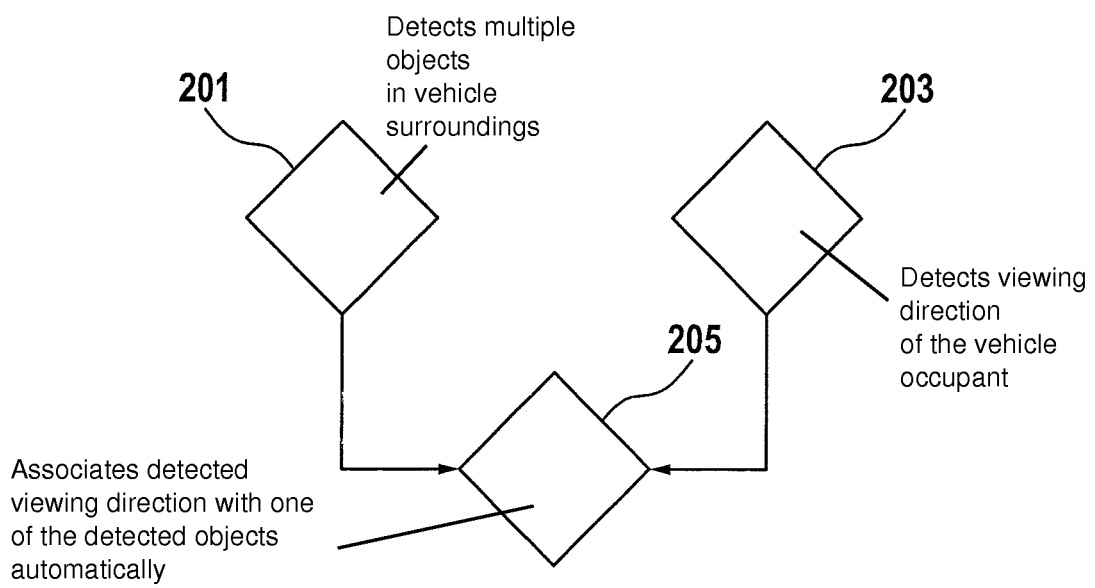
FIG. 2 shows a flow chart of a method for monitoring a vehicle occupant.

FIG. 2 shows a flow chart of a method for monitoring a vehicle occupant.

Multiple objects in the vehicle surroundings are detected with the aid of a surroundings detection device according to a step 201. A viewing direction of the vehicle occupant is detected with the aid of a gaze detection device according to a step 203. The detected viewing direction is then automatically associated with one of the detected objects with the aid of an association device in a step 205 to determine which object of the multiple objects the vehicle occupant has viewed.

FIG. 3 shows a flow chart of another method for monitoring a vehicle occupant.

Multiple objects in the vehicle surroundings are detected with the aid of a surroundings detection device in a step 301. Such a surroundings detection device may include a video system and/or a radar system, for example. The surroundings detection device thus advantageously recognizes the objects present along the route, in particular on the roadway or at the roadside, such as an advertising poster at a bus station or an advertising pillar. These objects are detected by the distance estimation and object classification of the video camera or by a distance measurement and radar object determination of the radar system.

A viewing direction of the vehicle occupant is detected with the aid of a gaze detection device in a step 303. Such a gaze detection device may include an eye tracking system. Thus, the gaze detection device may advantageously recognize where the vehicle occupant gazes at a vehicle window, for example at a windshield, i.e., an area of the windshield, and the gaze detection device thus recognizes a viewing direction and/or an angle from the window.

The detected viewing direction is now automatically associated with one of the detected objects with the aid of an association device according to a step 305 for a determination concerning which object of the multiple objects the vehicle occupant has viewed. The gaze of the vehicle occupant or the gazes of the vehicle occupant is/are thus advantageously associated with the detected objects on the roadway or at the roadside.

An identity of the vehicle occupant is linked to the viewed object in a step 307. The detection of the identity of the vehicle occupant may be carried out in particular in step 307. The identity of the vehicle occupant may be detected prior to step 307.

This information, including the viewed object together with the identity of the vehicle occupant, is transmitted to a cloud server according to a step 309. For example, it may be provided that the transmission is carried out via a mobile wireless network. In particular, it may be provided that the above-mentioned information is uploaded or stored in a social network.

Thus, the cloud server may advantageously collect and store appropriately formed view/object profiles of a plurality of vehicle occupants.

The information transmitted to the cloud server may be statistically evaluated or processed as a whole for one user or also for multiple users in a step 311. This advantageously results in typical profiles of where vehicle occupants have looked particularly often or particularly seldom during a trip. Thus, for example, the attractiveness of an advertising location may be researched and recorded. In particular, information may thus be provided concerning whether certain information signs along the driving route are seen often or seldom by the vehicle occupants. If it is determined, for example, that certain information signs are less frequently looked at, it may be provided that these information signs are identified more clearly with the aid of a signal color or a signaling device, in particular when these information signs are safety-relevant information signs. In particular, it may be provided that a location of these information signs is changed. This means in particular that at locations where the vehicle occupants look at objects particularly often, the above-mentioned information signs are positioned at these locations, and may be relatively close to the objects already viewed there.

A message, in particular an e-mail, is then sent to the vehicle occupant in a step 313. In particular, it may be provided that, alternatively or additionally, an SMS text message is sent to the vehicle occupant. The sent message may in particular be advertising information concerning the viewed object, in particular a product advertised with the aid of a billboard.

It may be provided that the message is formed based on the statistical evaluation, and in particular includes information concerning the most frequently viewed object. Thus, only one message concerning the most frequently viewed object may be sent to the vehicle occupant. For example, it may be provided that the sent message includes information concerning where the object, i.e., the object advertised with the aid of the billboard, may be purchased. In particular, it may be provided that the message includes information concerning a route to the point of purchase. In particular, it may be provided that the cloud server computes such a route and transmits same directly to a navigation system of the vehicle, which then displays the route to the user and appropriately navigates him to the point of purchase corresponding to the route.

The present invention thus includes in particular the concept of detecting an actual perception of advertising, instructions, warnings, and/or information, for example, on and near the route, in particular the roadway, by a combined evaluation of, for example, video/radar systems with eye tracking systems of a vehicle. Thus, statistics may advantageously be generated in a targeted manner with the aid of a cloud-based analysis and processed for further use, in particular a commercial or a safety-relevant use. For example, navigation to the store having the product from the advertisement may be provided. It is thus also advantageously made possible to measure the success of advertising campaigns, for example with the aid of campaign posters.

What is claimed is:

1. A computer-implemented method for monitoring a vehicle occupant, the method comprising:
   detecting, by a surroundings detection device having a first sensor system, multiple objects in the vehicle surroundings;
   detecting, by a gaze detection device having a second sensor system, a viewing direction of the vehicle occupant; and
   automatically associating, by an association device having a computer processor, the detected viewing direction with one of the detected objects to determine which object of the multiple objects the vehicle occupant has viewed.

2. The method of claim 1, wherein the detected viewing direction is associated with one of the detected objects only when the detected viewing direction points, at least indirectly, in the direction of a vehicle window.

3. The method of claim 1, wherein information concerning the viewed object is queried from a database and provided to the vehicle occupant.

4. The method of claim 3, wherein the information concerning the viewed objected is provided one of: visually, acoustically, or haptically.

5. The method of claim 1, wherein a navigation system provides the vehicle occupant with a recommended route based on the viewed object.

6. The method of claim 1, wherein while the vehicle occupant is traveling on a route from a first position to a second position, a recording is made of which objects the vehicle occupant has viewed along the route in order to create a corresponding view/object profile for this route.

7. The method of claim 6, wherein the vehicle occupant travels along the route multiple times thereby creating multiple profiles for statistical evaluation.

8. The method of claim 7, wherein the statistical evaluation determines which of the objects along the route are most viewed and least viewed.

9. The method of claim 6, wherein the recorded view/object profile is transmitted to a cloud server for an evaluation of the view/object profile.

10. The method of claim 1, wherein an identity of the vehicle occupant is detected and linked to the viewed object.

11. The method of claim 1, wherein information concerning the viewed object is queried from a database and provided to the vehicle occupant, wherein an identity of the vehicle occupant is detected and linked to the viewed object, and wherein the provision of the information includes transmitting the information as a personal message to the vehicle occupant.

12. The method of claim 1, wherein an instantaneous location of the vehicle occupant relative to a coordinate system formed externally with respect to the vehicle is determined and linked to the viewed object.

13. The method of claim 1, wherein the determination of the object viewed by the vehicle occupant is further used to recognize whether the vehicle occupant is distracted during travel.

14. The method of claim 13, wherein the determination of the object viewed by the vehicle occupant is further used to determine an accident risk by evaluating whether the occupant views objects relevant to safety, the objects relevant to safety including at least one of: other vehicles, obstructions, navigation signs, general information signs, and boundary markers along a road.

15. The method of claim 1, wherein the vehicle occupant is at least one of a driver of the vehicle and a passenger of the vehicle.

16. The method of claim 1, wherein the detecting multiple objects in the vehicle surroundings includes a classification of each individual determined object.

17. A device for monitoring a vehicle occupant, comprising:
   a surroundings detection device for detecting multiple objects in the vehicle surroundings;
   a gaze detection device for detecting a viewing direction of the vehicle occupant; and
   an association device for automatically associating the detected viewing direction with one of the detected objects to determine which object of the multiple objects the vehicle occupant has viewed.

18. A non-transitory computer readable storage medium storing a computer program that is executable by a processor, the storage medium comprising:
   a program code arrangement having program code for monitoring a vehicle occupant, by performing the following:
      detecting multiple objects in the vehicle surroundings with the aid of a surroundings detection device;
      detecting a viewing direction of the vehicle occupant with the aid of a gaze detection device; and
      automatically associating the detected viewing direction with one of the detected objects with the aid of an association device to determine which object of the multiple objects the vehicle occupant has viewed.

* * * * *